US 11,480,098 B1

United States Patent
Al-Huwaider et al.

(10) Patent No.: US 11,480,098 B1
(45) Date of Patent: Oct. 25, 2022

(54) CONTINUOUSLY VARIABLE TRANSMISSION (CVT) DRIVEN SUPERCHARGER THROUGH TRANSMISSION OUTPUT

(71) Applicants: Mustafa Ali Al-Huwaider, Dhahran (SA); Hussain Abdulsattar Al-Hashim, Dhahran (SA)

(72) Inventors: Mustafa Ali Al-Huwaider, Dhahran (SA); Hussain Abdulsattar Al-Hashim, Dhahran (SA)

(73) Assignee: Mustafa Ali Al-Huwaider, Dhahran (SA)

( * ) Notice: Subject to any disclaimer, the term of this patent is extended or adjusted under 35 U.S.C. 154(b) by 0 days.

(21) Appl. No.: 17/383,715

(22) Filed: Jul. 23, 2021

(51) Int. Cl.
*F02B 39/04* (2006.01)
*B60K 17/02* (2006.01)
*B60K 17/04* (2006.01)

(52) U.S. Cl.
CPC .............. *F02B 39/04* (2013.01); *B60K 17/02* (2013.01); *B60K 17/04* (2013.01)

(58) Field of Classification Search
CPC ......... B60K 17/02; B60K 17/04; F02B 39/04; F02B 67/10
See application file for complete search history.

(56) References Cited

U.S. PATENT DOCUMENTS

| 5,361,744 A * | 11/1994 | Teraoka .................. F02B 39/04 |
| | | 123/561 |
| 5,890,468 A * | 4/1999 | Ozawa ..................... F02B 33/32 |
| | | 123/561 |
| 7,055,507 B2 | 6/2006 | Kelley, Jr. |
| 8,763,586 B2 | 7/2014 | Ouwenga et al. |
| 8,910,614 B2 * | 12/2014 | Bevan ................. F02D 41/0007 |
| | | 123/568.11 |
| 9,644,530 B2 | 5/2017 | Versteyhe et al. |
| 10,030,577 B2 * | 7/2018 | Kai .......................... F02B 61/00 |

FOREIGN PATENT DOCUMENTS

CA        2786580        8/2011

* cited by examiner

*Primary Examiner* — Tinh Dang
(74) *Attorney, Agent, or Firm* — Richard Gearhart; Gearhart Law, LLC

(57) ABSTRACT

A vehicle intake supercharger is described herein. The supercharger is driven by a continuously variable transmission (CVT), which is driven by a main car transmission through a transmission output shaft. The present invention significantly improves boost by the supercharger at mid and high-end revolutions per minute (RPMs) and reduces boost lag at low-end RPMs with lower power withdrawn from the engine at higher gears. As the transmission output gets faster, lower engine power is required to spin the supercharger, where boost is optimized by the CVT depending on many factors, such as driving conditions, driver input, engine RPM and max engine intake pressure.

11 Claims, 17 Drawing Sheets

| Engine RPM | 1st Gear Ratio | Output Shaft RPM | CVT Ratio at 1st Gear | CVT Output RPM | Charger Pulley Ratio | Charger RPM at 1st Gear |
|---|---|---|---|---|---|---|
| 0 | 2.86 | 0 | 0.35 | 0 | 0.5 | 0 |
| 500 | 2.86 | 175 | 0.35 | 500 | 0.5 | 1000 |
| 1000 | 2.86 | 350 | 0.35 | 1000 | 0.5 | 2000 |
| 1500 | 2.86 | 525 | 0.35 | 1500 | 0.5 | 3000 |
| 2000 | 2.86 | 700 | 0.35 | 2000 | 0.5 | 4000 |
| 2500 | 2.86 | 875 | 0.35 | 2500 | 0.5 | 5000 |
| 3000 | 2.86 | 1050 | 0.35 | 3000 | 0.5 | 6000 |
| 3500 | 2.86 | 1225 | 0.35 | 3500 | 0.5 | 7000 |
| 4000 | 2.86 | 1400 | 0.35 | 4000 | 0.5 | 8000 |
| 4500 | 2.86 | 1575 | 0.35 | 4500 | 0.5 | 9000 |
| 5000 | 2.86 | 1750 | 0.35 | 5000 | 0.5 | 10000 |
| 5500 | 2.86 | 1925 | 0.35 | 5500 | 0.5 | 11000 |
| 6000 | 2.86 | 2100 | 0.35 | 6000 | 0.5 | 12000 |
| 6500 | 2.86 | 2275 | 0.35 | 6500 | 0.5 | 13000 |
| 7000 | 2.86 | 2450 | 0.35 | 7000 | 0.5 | 14000 |

| Engine RPM | 3rd Gear Ratio | Output Shaft RPM | CVT Ratio at 3rd Gear | CVT Output RPM | Charger Pulley Ratio | Charger RPM at 3rd Gear |
|---|---|---|---|---|---|---|
| 0 | 1.33 | 0 | 0.35 | 0 | 0.5 | 0 |
| 500 | 1.33 | 375 | 0.35 | 1071 | 0.5 | 2143 |
| 1000 | 1.33 | 750 | 0.35 | 2143 | 0.5 | 4286 |
| 1500 | 1.33 | 1125 | 0.35 | 3214 | 0.5 | 6429 |
| 2000 | 1.33 | 1500 | 0.35 | 4286 | 0.5 | 8571 |
| 2500 | 1.33 | 1875 | 0.35 | 5357 | 0.5 | 10714 |
| 3000 | 1.33 | 2250 | 0.35 | 6429 | 0.5 | 12857 |
| 3500 | 1.33 | 2625 | 0.35 | 7500 | 0.5 | 15000 |
| 4000 | 1.33 | 3000 | 0.38 | 8000 | 0.5 | 16000 |
| 4500 | 1.33 | 3375 | 0.42 | 8000 | 0.5 | 16000 |
| 5000 | 1.33 | 3750 | 0.47 | 8000 | 0.5 | 16000 |
| 5500 | 1.33 | 4125 | 0.52 | 8000 | 0.5 | 16000 |
| 6000 | 1.33 | 4500 | 0.56 | 8000 | 0.5 | 16000 |
| 6500 | 1.33 | 4875 | 0.61 | 8000 | 0.5 | 16000 |
| 7000 | 1.33 | 5250 | 0.66 | 8000 | 0.5 | 16000 |

| Engine RPM | 4th Gear Ratio | Output Shaft RPM | CVT Ratio at 4th Gear | CVT Output RPM | Charger Pulley Ratio | Charger RPM at 4th Gear |
|---|---|---|---|---|---|---|
| 0 | 1 | 0 | 0.35 | 0 | 0.5 | 0 |
| 500 | 1 | 500 | 0.35 | 1429 | 0.5 | 2857 |
| 1000 | 1 | 1000 | 0.35 | 2857 | 0.5 | 5714 |
| 1500 | 1 | 1500 | 0.35 | 4286 | 0.5 | 8571 |
| 2000 | 1 | 2000 | 0.35 | 5714 | 0.5 | 11429 |
| 2500 | 1 | 2500 | 0.35 | 7143 | 0.5 | 14286 |
| 3000 | 1 | 3000 | 0.38 | 8000 | 0.5 | 16000 |
| 3500 | 1 | 3500 | 0.44 | 8000 | 0.5 | 16000 |
| 4000 | 1 | 4000 | 0.50 | 8000 | 0.5 | 16000 |
| 4500 | 1 | 4500 | 0.56 | 8000 | 0.5 | 16000 |
| 5000 | 1 | 5000 | 0.63 | 8000 | 0.5 | 16000 |
| 5500 | 1 | 5500 | 0.69 | 8000 | 0.5 | 16000 |
| 6000 | 1 | 6000 | 0.75 | 8000 | 0.5 | 16000 |
| 6500 | 1 | 6500 | 0.81 | 8000 | 0.5 | 16000 |
| 7000 | 1 | 7000 | 0.88 | 8000 | 0.5 | 16000 |

| Engine RPM | 5th Gear Ratio | Output Shaft RPM | CVT Ratio at 5th Gear | CVT Output RPM | Charger Pulley Ratio | Charger RPM at 5th Gear |
|---|---|---|---|---|---|---|
| 0 | 0.8 | 0 | 0.35 | 0 | 0.5 | 0 |
| 500 | 0.8 | 625 | 0.35 | 1786 | 0.5 | 3571 |
| 1000 | 0.8 | 1250 | 0.35 | 3571 | 0.5 | 7143 |
| 1500 | 0.8 | 1875 | 0.35 | 5357 | 0.5 | 10714 |
| 2000 | 0.8 | 2500 | 0.35 | 7143 | 0.5 | 14286 |
| 2500 | 0.8 | 3125 | 0.39 | 8000 | 0.5 | 16000 |
| 3000 | 0.8 | 3750 | 0.47 | 8000 | 0.5 | 16000 |
| 3500 | 0.8 | 4375 | 0.55 | 8000 | 0.5 | 16000 |
| 4000 | 0.8 | 5000 | 0.63 | 8000 | 0.5 | 16000 |
| 4500 | 0.8 | 5625 | 0.70 | 8000 | 0.5 | 16000 |
| 5000 | 0.8 | 6250 | 0.78 | 8000 | 0.5 | 16000 |
| 5500 | 0.8 | 6875 | 0.86 | 8000 | 0.5 | 16000 |
| 6000 | 0.8 | 7500 | 0.94 | 8000 | 0.5 | 16000 |
| 6500 | 0.8 | 8125 | 1.02 | 8000 | 0.5 | 16000 |
| 7000 | 0.8 | 8750 | 1.09 | 8000 | 0.5 | 16000 |

| 238 Engine RPM | 364 Gear Ratio | 366 Output Shaft RPM | 368 CVT Ratio | 370 CVT Output RPM | 372 Charger Pulley Ratio | 374 Supercharger RPM | |
|---|---|---|---|---|---|---|---|
| 0 | 2.86 | 0 | 0.35 | 0 | 0.5 | 0 | |
| 500 | 2.86 | 175 | 0.35 | 500 | 0.5 | 1000 | |
| 1000 | 2.86 | 350 | 0.35 | 1000 | 0.5 | 2000 | |
| 1500 | 2.86 | 525 | 0.35 | 1500 | 0.5 | 3000 | |
| 2000 | 2.86 | 700 | 0.35 | 2000 | 0.5 | 4000 | |
| 2500 | 2.86 | 875 | 0.35 | 2500 | 0.5 | 5000 | |
| 3000 | 2.86 | 1050 | 0.35 | 3000 | 0.5 | 6000 | |
| 3500 | 2.86 | 1225 | 0.35 | 3500 | 0.5 | 7000 | 1st Gear |
| 4000 | 2.86 | 1400 | 0.35 | 4000 | 0.5 | 8000 | 376 |
| 4500 | 2.86 | 1575 | 0.35 | 4500 | 0.5 | 9000 | |
| 5000 | 2.86 | 1750 | 0.35 | 5000 | 0.5 | 10000 | |
| 5500 | 2.86 | 1925 | 0.35 | 5500 | 0.5 | 11000 | |
| 6000 | 2.86 | 2100 | 0.35 | 6000 | 0.5 | 12000 | |
| 6500 | 2.86 | 2275 | 0.35 | 6500 | 0.5 | 13000 | |
| 7000 | 2.86 | 2450 | 0.35 | 7000 | 0.5 | 14000 | |
| 4455 | 1.82 | 2450 | 0.35 | 7000 | 0.5 | 14000 | |
| 4500 | 1.82 | 2475 | 0.35 | 7071 | 0.5 | 14143 | |
| 5000 | 1.82 | 2750 | 0.35 | 7857 | 0.5 | 15714 | |
| 5500 | 1.82 | 3025 | 0.38 | 8000 | 0.5 | 16000 | 2nd Gear |
| 6000 | 1.82 | 3300 | 0.41 | 8000 | 0.5 | 16000 | 378 |
| 6500 | 1.82 | 3575 | 0.45 | 8000 | 0.5 | 16000 | |
| 7000 | 1.82 | 3850 | 0.48 | 8000 | 0.5 | 16000 | |
| 5133 | 1.33 | 3850 | 0.48 | 8000 | 0.5 | 16000 | |
| 5500 | 1.33 | 4125 | 0.52 | 8000 | 0.5 | 16000 | |
| 6000 | 1.33 | 4500 | 0.56 | 8000 | 0.5 | 16000 | 3rd Gear |
| 6500 | 1.33 | 4875 | 0.61 | 8000 | 0.5 | 16000 | 380 |
| 7000 | 1.33 | 5250 | 0.66 | 8000 | 0.5 | 16000 | |
| 5250 | 1 | 5250 | 0.66 | 8000 | 0.5 | 16000 | |
| 5500 | 1 | 5500 | 0.69 | 8000 | 0.5 | 16000 | |
| 6000 | 1 | 6000 | 0.75 | 8000 | 0.5 | 16000 | 4th Gear |
| 6500 | 1 | 6500 | 0.81 | 8000 | 0.5 | 16000 | 382 |
| 7000 | 1 | 7000 | 0.88 | 8000 | 0.5 | 16000 | |
| 5600 | 0.8 | 7000 | 0.88 | 8000 | 0.5 | 16000 | |
| 6000 | 0.8 | 7500 | 0.94 | 8000 | 0.5 | 16000 | 5th Gear |
| 6500 | 0.8 | 8125 | 1.02 | 8000 | 0.5 | 16000 | 384 |
| 7000 | 0.8 | 8750 | 1.09 | 8000 | 0.5 | 16000 | |

FIG. 14

CONTINUOUSLY VARIABLE TRANSMISSION (CVT) DRIVEN SUPERCHARGER THROUGH TRANSMISSION OUTPUT

FIELD OF THE EMBODIMENTS

The field of the invention and its embodiments relate to a continuously variable transmission (CVT) driven supercharger through transmission output.

BACKGROUND OF THE EMBODIMENTS

Since the invention of internal combustion engine, automotive manufacturers and car enthusiasts have searched for ways to increase engine power. One way to increase engine power includes making the engine larger with increased displacement and a greater number of cylinders. However, this solution results in the engine becoming heavier. Another method to increase engine power includes forcing more air into the engine and mixing the air with more fuel to make a more powerful combustion, resulting in greater horsepower and higher torque. Examples of forced air induction systems that pressurize air intake above atmospheric pressure include turbochargers and superchargers.

Turbochargers and superchargers differ in their source of energy. Turbocharging is the most commonly used supercharging technology by internal combustion engines (ICE) for forced intake air induction. With turbocharging, the exhaust-gas energy is used to increase the inlet air destiny. Specifically, turbochargers are powered by the mass-flow of exhaust gases driving a turbine.

On the other hand, superchargers are mechanically powered by belt or chain drive from the engine's crankshaft. Both systems depend on engine revolutions per minute (RPM), or the number of turns in one minute. For turbochargers, the higher the RPM, the higher the mass-flow of exhaust gases to drive the turbocharger, which creates "boost lag" at the low end RPM. Turbochargers add about 50 percent more power to the engine as compared to superchargers. To increase turbocharger efficiency and boost, larger turbochargers are used, but that worsens boost lag at low to mid-RPMs.

Many technological advances have increased the efficiency of turbochargers and have reduced the boost lag. For example, a twin-scroll turbocharger system requires a divided-inlet turbine housing and a properly-designed exhaust manifold that pairs the correct cylinders to direct flow into each scroll independently. On a four-cylinder application, the cylinder that fires first and the cylinder that fires third will be teamed on one scroll. As another example, a variable-geometry turbocharger is designed to allow the effective aspect ratio of the turbocharger to be altered as conditions change. This is done because the optimum aspect ratio at low engine speeds is very different from that at high engine speeds. Despite the benefits of these turbochargers, they fail to eliminate the lag all together.

Furthermore, a turbocharger is more efficient than a supercharger since turbochargers run on wasted exhaust energy instead of engine crankshaft. However, the inefficiency of a turbocharger comes from the fact that it restricts exhaust flow to spin, which creates back pressure on the engine, resulting in subtracting some power from the engine. Also, turbocharger setups are more complex than supercharger setups.

There are multiple types of superchargers, such as roots, twin-screw and centrifugal superchargers. Supercharging adds an average of 45 percent more horsepower and 30 percent more torque. Superchargers' inefficiency is caused by the withdrawn power from engine's crankshaft to run them (e.g., parasitic load). Roots and twin-screw superchargers provide high boost and torque at low engine RPM; however, this tends to flat and drop at high RPMs. Centrifugal superchargers provide consistent and smooth increase in the boost and torque, with higher boost potential at higher RPMs. Similar to turbochargers, centrifugal superchargers suffer from boost lag at low RPM. Therefore, a system to reduce boost lag at low end RPM and significantly improve boost at mid and high-end RPM is desired.

Further, many methods are known to reduce boost lag and improve boost at low, mid, and high-end range. One of these methods includes including a transmission or continuously variable transmission (CVT) between the engine and the centrifugal supercharger to optimize the spinning rate of the charger. A CVT is an automatic transmission that can change seamlessly through a continuous range of gear ratios. However, the issue with such method is that they still rely on engine RPM, which creates boost lag. When a lower transmission or CVT final drive ratio is used to increase the charger's spinning rate to reduce lag at low RPM, more torque (e.g., parasitic load) is required from the engine, which leads to lower engine power than the ideal scenario if no additional torque is withdrawn from the engine. Moreover, such solution requires more space inside the engine bay and more weight at the front of the vehicle. In addition to that, the CVT has to cope with frequent and hard engine's RPM fluctuations (including accelerations and deceleration) to adjust and keep the supercharger at optimum boost. This leads to wear and tear of the CVT, which leads to a shortening of its lifespan, and ultimately leads to complete system failure. When the centrifugal supercharger is compared to the turbocharger at the same boost (e.g., 13.6 PSI) at around 6400 RPM, the turbocharger produces more torque in the engine by around 100 lb./ft. Much of that amount is withdrawn by the supercharger. Therefore, a system that can reduce that gap for a centrifugal supercharger is desired.

SUMMARY OF THE EMBODIMENTS

The present invention and its embodiments relate to a vehicle intake centrifugal supercharger is driven by the CVT, which is driven by a main car transmission through a transmission output shaft. The present invention significantly improves boost by the supercharger at mid and high-end RPMs and reduces boost lag at low-end RPMs with lower power withdrawn from the engine at higher gears. As the transmission output gets faster, lower engine power is required to spin the supercharger, where boost is optimized by the CVT depending on many factors, such as driving conditions, driver input, engine RPM and max engine intake pressure.

A first embodiment of the present invention describes a system in a vehicle. The system includes: an engine, a main transmission, a centrifugal supercharger, and a CVT. The CVT is connected to an output shaft of the main transmission via one or more gears and connected to the centrifugal supercharger through a CVT output shaft and CVT pulleys. The output shaft of the main transmission is affixed to a drive shaft via at least one joint. The system also includes a first pulley with a clutch affixed to the centrifugal supercharger, a second pulley, and a belt disposed around the first pulley with a clutch and the second pulley. The CVT output shaft is affixed to the second pulley.

In a first example, the CVT output shaft is rigid. In a second example, the CVT output shaft is flexible. In examples, the clutch is an electromagnetic clutch.

BRIEF DESCRIPTION OF THE DRAWINGS

FIG. 14 depicts a tabular representation of system performance during acceleration, according to at least some embodiments disclosed herein.

DESCRIPTION OF THE PREFERRED EMBODIMENTS

Figure 1:
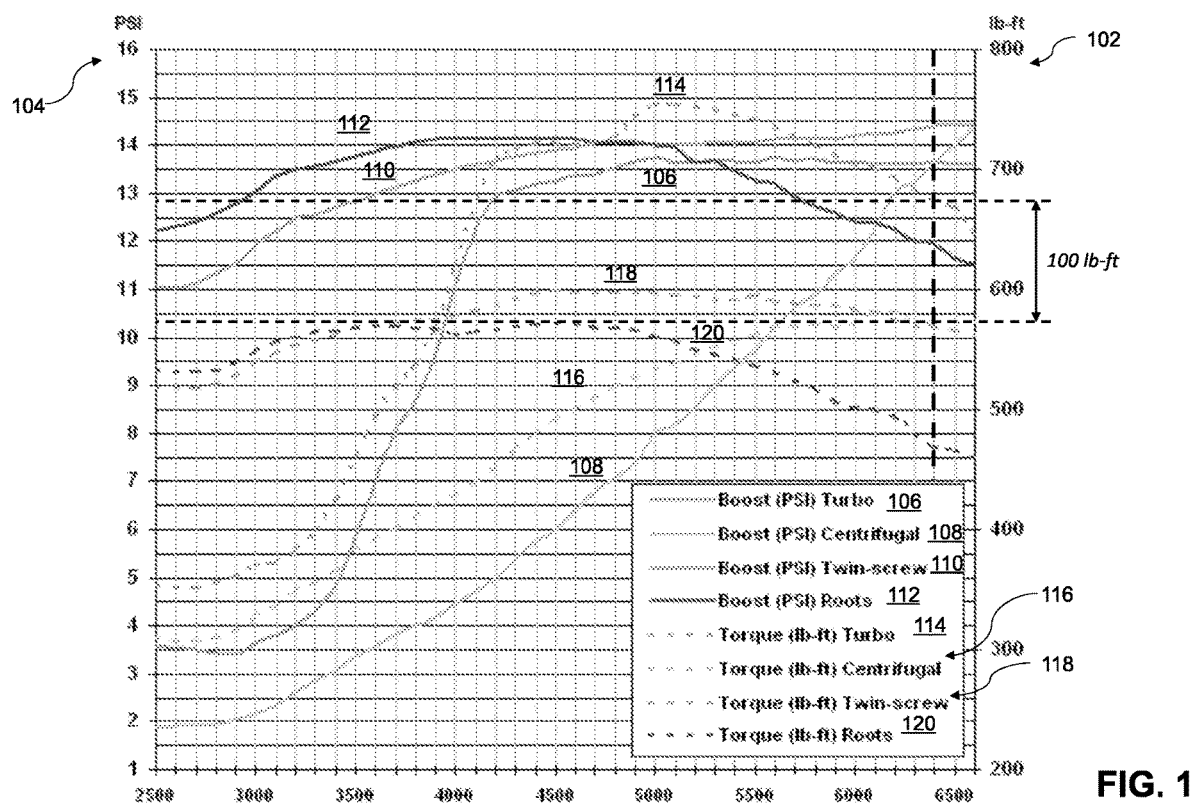
FIG. 1 depicts a graphical representation of boost and torque curves for different forced induction systems, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

An internal combustion engine (ICE) is a heat engine in which the combustion of a fuel occurs with an oxidizer (usually air) in a combustion chamber that is an integral part of the working fluid flow circuit. In an ICE, the expansion of the high-temperature and high-pressure gases produced by combustion applies direct force to some component of the engine. This force moves the component over a distance, transforming chemical energy into useful work.

As explained, one way to increase engine power includes forcing more air into it and mixing the air with more fuel to make a more powerful combustion, resulting in greater horsepower and higher torque. Examples of forced air induction systems that pressurize air intake above atmospheric pressure include turbochargers and superchargers.

Turbochargers and superchargers differ in their source of energy. With turbocharging, the exhaust-gas energy is used to increase the inlet air destiny. Specifically, turbochargers are powered by the mass-flow of exhaust gases driving a turbine. The introduction of a turbocharger will also act as a restriction for the flow of the exhaust gas, which will cause the generation of a backpressure in the exhaust manifold. The backpressure will force the piston to consume more energy to displace the burnt gases out of the cylinder. If the backpressure is too high, there is a risk of a backflow, which means that the exhaust gases will flow back into the cylinder and intake manifold, decreasing the volumetric efficiency and the overall performance of the engine.

The turbocharger also has a significant impact on the transient response of the engine (acceleration). The power output of an engine is directly dependent on the intake air mass. For a turbocharged engine, to quickly increase the air mass in the cylinders, the turbine needs to accelerate and drive the compressor. The bigger the mass moment of inertia of the turbine, shaft, and compressor, the longer the time required for acceleration (turbo-lag).

Two examples of turbochargers include a twin-scroll turbocharger and a variable-geometry turbocharger. A twin-scroll turbocharger system requires a divided-inlet turbine housing and a properly-designed exhaust manifold that pairs the correct cylinders to direct flow into each scroll independently. A variable-geometry turbocharger is designed to allow the effective aspect ratio of the turbocharger to be altered as conditions change. This is done because the optimum aspect ratio at low engine speeds is very different from that at high engine speeds. Despite the benefits of the twin-scroll turbocharger and the variable geometry turbocharger, these systems cannot eliminate the lag all together.

Superchargers are mechanically powered by belt or chain drive from the engine's crankshaft. There are multiple types of superchargers, such as roots, twin-screw and centrifugal superchargers. Supercharging adds an average of 45 percent more horsepower and 30 percent more torque. Superchargers' inefficiency is caused by the withdrawn power from engine's crankshaft to run them (e.g., parasitic load). Roots and twin-screw superchargers provide high boost and torque at low engine RPM, but that tends to flat and drop at high RPMs, as shown in FIG. 1. Specifically, FIG. 1 depicts a graphical representation of boost and torque curves for different forced induction systems, according to at least some embodiments disclosed herein. The centrifugal supercharger, however, is the most thermally efficient out of the three types with consistent and smooth increase in the boost and torque with higher boost potential at higher RPMs.

In fact, FIG. 1 depicts a graphical representation of boost and torque curves for different forced induction systems, according to at least some embodiments disclosed herein. FIG. 1 depicts a left-side y-axis 104 measuring PSI and a right-side y-axis 102 measuring lb./ft. Data associated with turbocharger boost 106 (in PSI), centrifugal supercharger boost 108 (in PSI), twin-screw supercharger boost 110 (in PSI), roots supercharger boost 112 (in PSI), turbocharger torque 114 (in lb./ft), centrifugal torque 116 (in lb./ft), twin-screw supercharger torque 118 (in lb./ft), and roots supercharger torque 120 (in lb./ft) are depicted on the graphical representation of FIG. 1.

Furthermore, turbochargers are more efficient than superchargers since turbochargers run on wasted exhaust energy instead of engine crankshaft. However, turbochargers inefficiency comes from the fact that it restricts exhaust flow to spin, which creates back pressure on the engine, which results in subtracting some power from the engine. Also, turbocharger setups are more complex than supercharger setups. Similar to turbochargers, centrifugal superchargers suffer from boost lag at low RPM. As such, the present invention provides a system to reduce boost lag at low end RPM and significantly improve boost at mid and high-end RPM.

Many methods were invented to reduce boost lag and improve boost at low, mid, and high-end range. One of the methods includes including a transmission or CVT between the engine and the supercharger to optimize the spinning rate of the charger. The issue with such method is that they still rely on engine RPM which creates boost lag as well, similar to turbochargers. When lower transmission or CVT final drive ratio is used to increase the charger's spinning rate to reduce lag at low RPM, more torque (e.g., parasitic load) is required from the engine, which leads to lower engine power than the ideal scenario if no additional torque is withdrawn from the engine. Moreover, such solution requires more space inside the engine bay and more weight at the front of the vehicle. In addition to that, the CVT has to cope with frequent and hard engine's RPM fluctuations (e.g., accelerations and deceleration) to adjust and keep the charger at optimum boost. That leads to wear and tear of the CVT which shorten its lifespan and ultimately leads to slips and complete system failure. When the centrifugal supercharger is compared to the turbocharger at the same boost (13.6 PSI) at around 6400 RPM, the turbocharger produces more torque in the engine by around 100 lb./ft. Much of that amount is withdrawn by the supercharger. Therefore, the present invention provides a system that can reduce that gap for a centrifugal supercharger.

More specifically, the instant invention describes a vehicle intake supercharger that is driven by a CVT, which is driven by a main car transmission through a transmission output shaft. As explained, the CVT is an automatic transmission that can change seamlessly through a continuous range of gear ratios. The invention described herein significantly improves boost by the supercharger at mid and high-end RPMs and reduce boost lag at low-end RPMs with lower power being withdrawn from the engine at higher gears. As the transmission output gets faster, lower engine power is required to spin the supercharger, where boost is optimized by the CVT depending on factors, such as driving conditions, driver input, engine RPM and max engine intake pressure.

Figure 2:
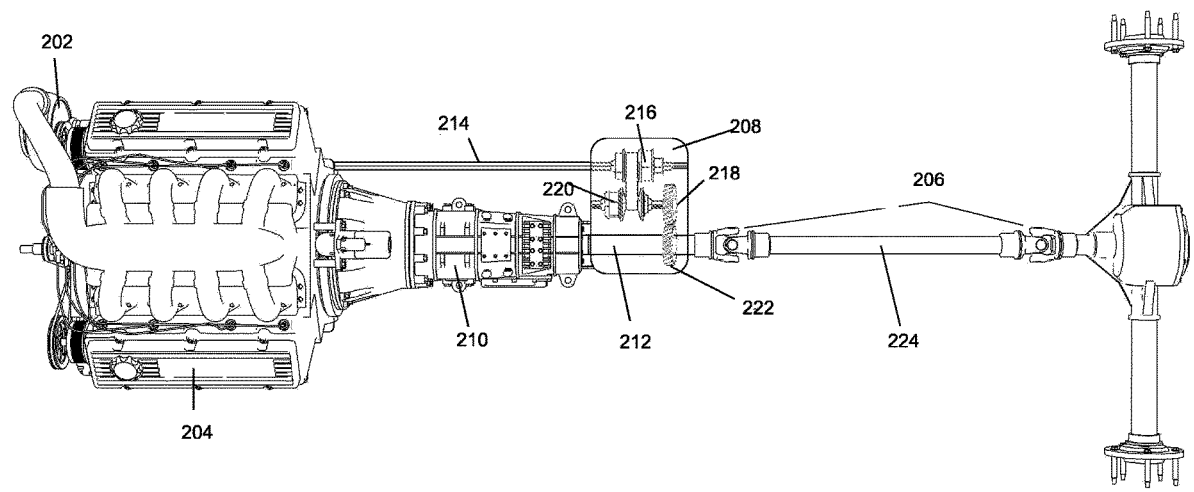
FIG. 2 depicts a top view of a schematic representation of a centrifugal supercharger driven by a transmission output shaft and continuously variable transmission (CVT), according to at least some embodiments disclosed herein.
Figure 3:
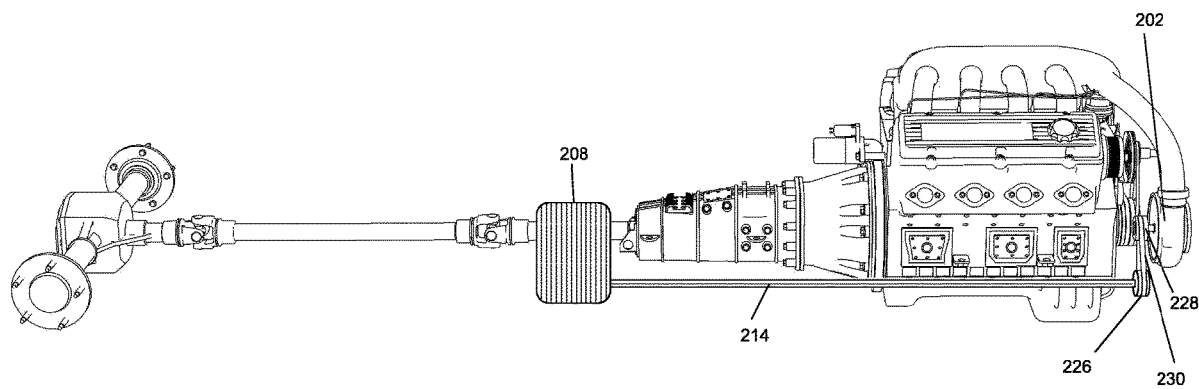
FIG. 3 depicts a side view of a schematic representation of a centrifugal supercharger driven by a transmission output shaft and CVT, according to at least some embodiments disclosed herein.

FIG. 2 depicts a top view of a schematic representation of a centrifugal supercharger driven by a transmission output shaft and continuously variable transmission (CVT), according to at least some embodiments disclosed herein. FIG. 3 depicts a side view of a schematic representation of a centrifugal supercharger driven by a transmission output shaft and CVT, according to at least some embodiments disclosed herein.

FIG. 2 and FIG. 3 depict the system of the present invention. As shown in FIG. 2, the system includes an engine 204, a CVT 208, and a centrifugal supercharger 202. The CVT 208 is connected to a main transmission output shaft 212 through a set of gears (e.g., a CVT gear 218 and an output shaft gear 222) having a 1:1 ratio. The CVT 208 is connected to the centrifugal supercharger 202 through CVT output shaft and pulleys (e.g., a CVT output shaft 214, a CVT drive pully 220, and a CVT driven pully 216). Also depicted in FIG. 2 for illustrative purposes are a main transmission 210, universal joints 206 and a drive shaft 224. FIG. 3 depicts the CVT 208, the CVT output shaft 214, the centrifugal supercharger 202, a pulley 226, a belt 230, and a pulley with the electromagnetic clutch 228.

Figure 4:
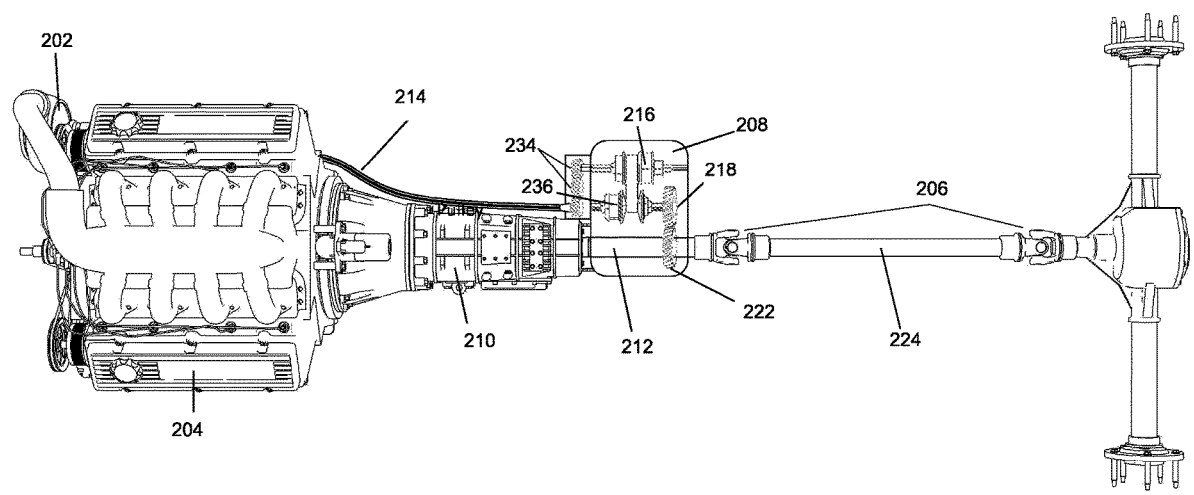
FIG. 4 depicts another top view of a schematic representation of a centrifugal supercharger driven by a transmission output shaft and CVT, according to at least some embodiments disclosed herein.
Figure 5:
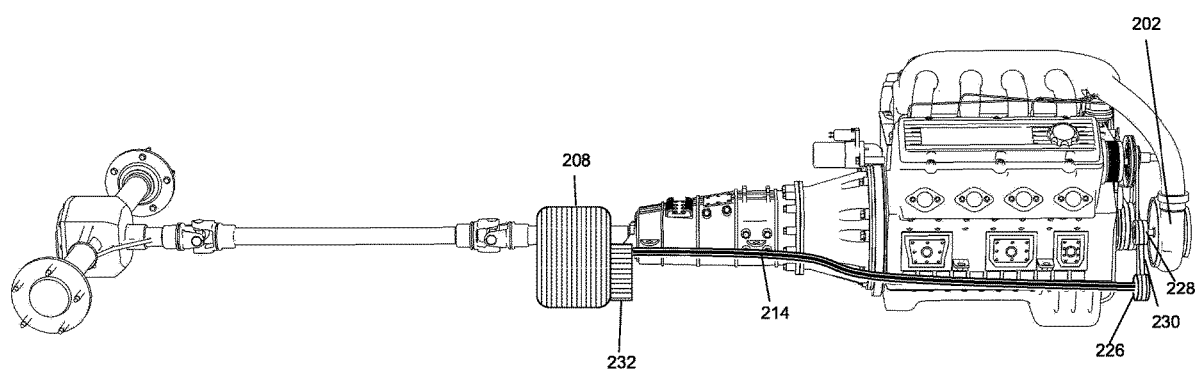
FIG. 5 depicts another side view of a schematic representation of a centrifugal supercharger driven by a transmission output shaft and CVT, according to at least some embodiments disclosed herein.

FIG. 4 depicts another top view of a schematic representation of a centrifugal supercharger driven by a transmission output shaft and CVT, according to at least some embodiments disclosed herein. FIG. 5 depicts another side view of a schematic representation of a centrifugal supercharger driven by a transmission output shaft and CVT, according to at least some embodiments disclosed herein.

The system of FIG. 4 and FIG. 5 is substantially similar to the system of FIG. 2 and FIG. 3. For example, as shown in FIG. 4, the CVT 208 is connected to a main transmission output shaft 212 through a set of gears (e.g., a CVT gear 218 and an output shaft gear 222) having a 1:1 ratio. The CVT 208 is connected to the centrifugal supercharger 202 through CVT output shaft and pulleys (e.g., a CVT output shaft 214, a CVT driven pully 216, and a CVT drive pulley 236). FIG. 4 also depicts the engine 204, the main transmission 210, universal joints 206, and a drive shaft 224. However, the system of FIG. 4 utilizes a flexible CVT output shaft 214 instead of a rigid shaft (of FIG. 2) to make the system more compact. The flexible CVT output shaft 214 of FIG. 4 is driven by the set of gears 234 after the CVT 208, having the same ratios.

FIG. 5 depicts the CVT 208, a gear box 232, the flexible CVT output shaft 214 (of FIG. 4), the pulley 226, the belt 230, the pulley with the electromagnetic clutch 228, and the centrifugal supercharger 202.

As depicted, the pulley with the electromagnetic clutch 228 (of FIG. 3 and FIG. 5) is necessary in the system of FIG.

2, FIG. 3, FIG. 4, and FIG. 5 to protect the centrifugal supercharger 202 and the engine 204 from high and trapped boost pressure in case the engine 204 is disconnected while cruising. In some examples, the centrifugal supercharger 202 can have a wastegate as a secondary protective measure.

The CVT 208 described herein and depicted in FIG. 2, FIG. 3, FIG. 4, and FIG. 5 must cover at least main transmission gear ratios in reverse. For example, if the main transmission gears ratios range from 2.86 (first gear) to 0.8 (fifth gear), the CVT 208 of FIG. 2, FIG. 3, FIG. 4, and FIG. 5 must at least cover a range of 0.35 to 1.25. It should be appreciated that lower CVT final drive ratio can be used (<0.35 e.g., 0.25) to improve boost at low RPM, but it must be optimized to have minimum parasitic loss impact on the engine 204.

Figure 6:
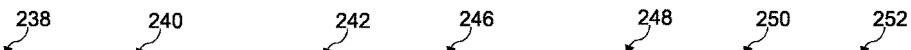
FIG. 6 depicts a tabular representation of system performance at first gear, according to at least some embodiments disclosed herein.

FIG. 6 depicts a tabular representation of system performance at first gear, according to at least some embodiments disclosed herein. More specifically, FIG. 6 includes numerous columns, such as: a first column 238 associated with engine RPM, a second column 240 associated with a first gear ratio, a third column 242 associated with output shaft RPM, a fourth column 246 associated with CVT ratio at first gear, a fifth column 248 associated with CVT output in RPM, a sixth column 250 associated with charger pulley ratio, and a seventh column 252 associated with charger RPM at first gear.

As shown in the table of FIG. 6, the fifth row of data shows that if the main transmission first gear ratio is 2.86 (e.g., the second column 240) and the engine RPM is 2000 (e.g., the first column 238), then the transmission output shaft (e.g., the third column 242) will have an RPM of 700. The CVT 208 is set at 0.35 ratio so that the 700 RPM is converted back to 2000 RPMs at the CVT output shaft 214 to drive the centrifugal supercharger 202 as if it was directly connected to the engine crankshaft. In this case, the centrifugal supercharger 202 will inevitably suffer from boost lag. However, at higher gears, the lag will start to be reduced significantly at low engine RPMs and the torque required to drive the centrifugal supercharger 202 is reduced as well, which improves the engine 204 torque. For example, if the main transmission fourth gear ratio is 1 (FIG. 9) and the CVT ratio is maintained at 0.35 at low RPM, then a 2000 RPM from the engine 204 will remain at 2000 RPM at the transmission output shaft and it will be converted to 5714 RPM driving the CVT output shaft pulley and 11,429 RPM driving the supercharger's pulley (0.5 ratio), indicating more boost and more engine 204 torque.

Figure 7:
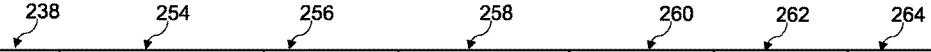
FIG. 7 depicts a tabular representation of system performance at second gear, according to at least some embodiments disclosed herein.

FIG. 7 depicts a tabular representation of system performance at second gear, according to at least some embodiments disclosed herein. FIG. 7 includes numerous columns, such as: a first column 238 associated with engine RPM, a second column 254 associated with a second gear ratio, a third column 256 associated with output shaft RPM, a fourth column 258 associated with CVT ratio at second gear, a fifth column 260 associated with CVT output in RPM, a sixth column 262 associated with charger pulley ratio, and a seventh column 264 associated with charger RPM at second gear.

Figure 8:
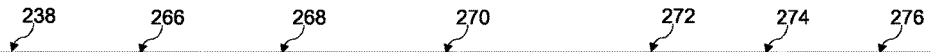
FIG. 8 depicts a tabular representation of system performance at third gear, according to at least some embodiments disclosed herein.

FIG. 8 depicts a tabular representation of system performance at third gear, according to at least some embodiments disclosed herein. FIG. 8 includes numerous columns, such as: a first column 238 associated with engine RPM, a second column 266 associated with a third gear ratio, a third column 268 associated with output shaft RPM, a fourth column 270 associated with CVT ratio at third gear, a fifth column 272 associated with CVT output in RPM, a sixth column 274 associated with charger pulley ratio, and a seventh column 276 associated with charger RPM at third gear.

Figure 9:
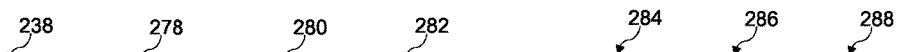
FIG. 9 depicts a tabular representation of system performance at fourth gear, according to at least some embodiments disclosed herein.

FIG. 9 depicts a tabular representation of system performance at fourth gear, according to at least some embodiments disclosed herein. FIG. 9 includes numerous columns, such as: a first column 238 associated with engine RPM, a second column 278 associated with a fourth gear ratio, a third column 280 associated with output shaft RPM, a fourth column 282 associated with CVT ratio at fourth gear, a fifth column 284 associated with CVT output in RPM, a sixth column 286 associated with charger pulley ratio, and a seventh column 288 associated with charger RPM at fourth gear.

Figure 10:
FIG. 10 depicts a tabular representation of system performance at fifth gear, according to at least some embodiments disclosed herein.

FIG. 10 depicts a tabular representation of system performance at fifth gear, according to at least some embodiments disclosed herein. FIG. 10 includes numerous columns, such as: a first column 238 associated with engine RPM, a second column 290 associated with a fifth gear ratio, a third column 292 associated with output shaft RPM, a fourth column 294 associated with CVT ratio at fifth gear, a fifth column 296 associated with CVT output in RPM, a sixth column 298 associated with charger pulley ratio, and a seventh column 300 associated with charger RPM at fifth gear.

Looking at FIG. 6-FIG. 10, if the centrifugal supercharger's 202 max RPM is 16,000 RPM for max boost on the engine 204, then the CVT 208 has to adjust the gear ratio to have a lower final drive RPM at higher engine RPM. In this case, if the engines 204 RPM is 4,000 RPM at fourth gear (e.g., FIG. 9), which leads to an output shaft RPM of 4,000, then the CVT 208 output will be around 11,429 if kept at a ratio of 0.35, which leads to 22,857 RPM at the centrifugal supercharger's 202 pulley. This can damage the centrifugal supercharger 202 or damage the engine 204 by high boost pressure.

It should be appreciated that the system described herein utilizes a wastegate to discharge excessive pressure. A wastegate, as described herein, is a valve that controls the flow of exhaust gases to the turbine wheel in a turbocharged engine system. The CVT 208 automatically and continuously adjusts the ratio to keep its output at a maximum and optimum supercharger RPM. Therefore, at 4,000 RPM transmission output shaft, the CVT ratio must be 0.5, as shown in FIG. 9, so that the CVT output shaft will rotate at 8,000 RPM and finally 16,000 RPM at the centrifugal supercharger's 202 pulley.

Figure 11:
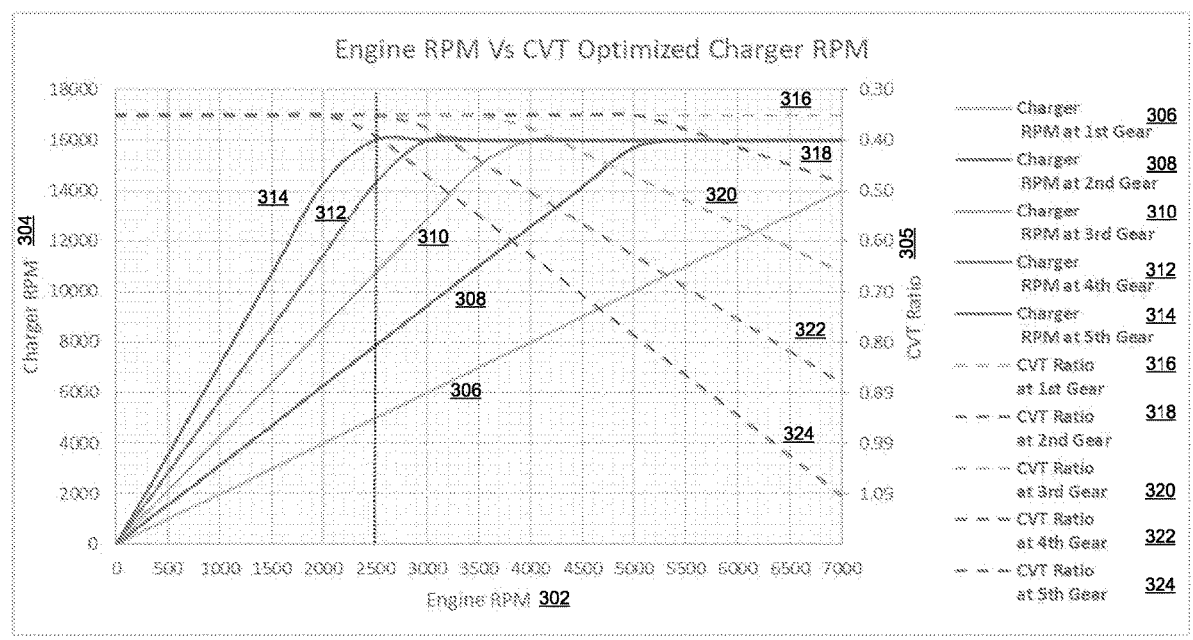
FIG. 11 depicts a graphical representation of supercharger revolutions per minute (RPM) and CVT ratios as compared to engine RPM curves at different transmission gears and optimized charger's RPM by CVT, according to at least some embodiments disclosed herein.

FIG. 11 depicts a graphical representation of supercharger RPM and CVT ratios as compared to engine RPM curves at different transmission gears and optimized charger's RPM by CVT, according to at least some embodiments disclosed herein. Specifically, FIG. 11 includes an x-axis 302 associated with engine RPM, a left y-axis 304 associated with charger RPM, and a right y-axis 305 associated with CVT ratio. Charger RPM at first gear 306, charger RPM at second gear 308, charger RPM at third gear 310, charger RPM at fourth gear 312, charger RPM at fifth gear 314, CVT ratio at first gear 316, CVT ratio at second gear 318, CVT ratio at third gear 320, CVT ratio at fourth gear 322, and CVT ratio at fifth gear 324 are all plotted in the graph of FIG. 11.

As shown in FIG. 11, at the fifth gear and 2500 engine RPM, the centrifugal supercharger 202 is spinning at its maximum RPM, which provides maximum boost at lower RPM and significantly reduced boost lag. That is demonstrated clearly in FIG. 12.

Figure 12:
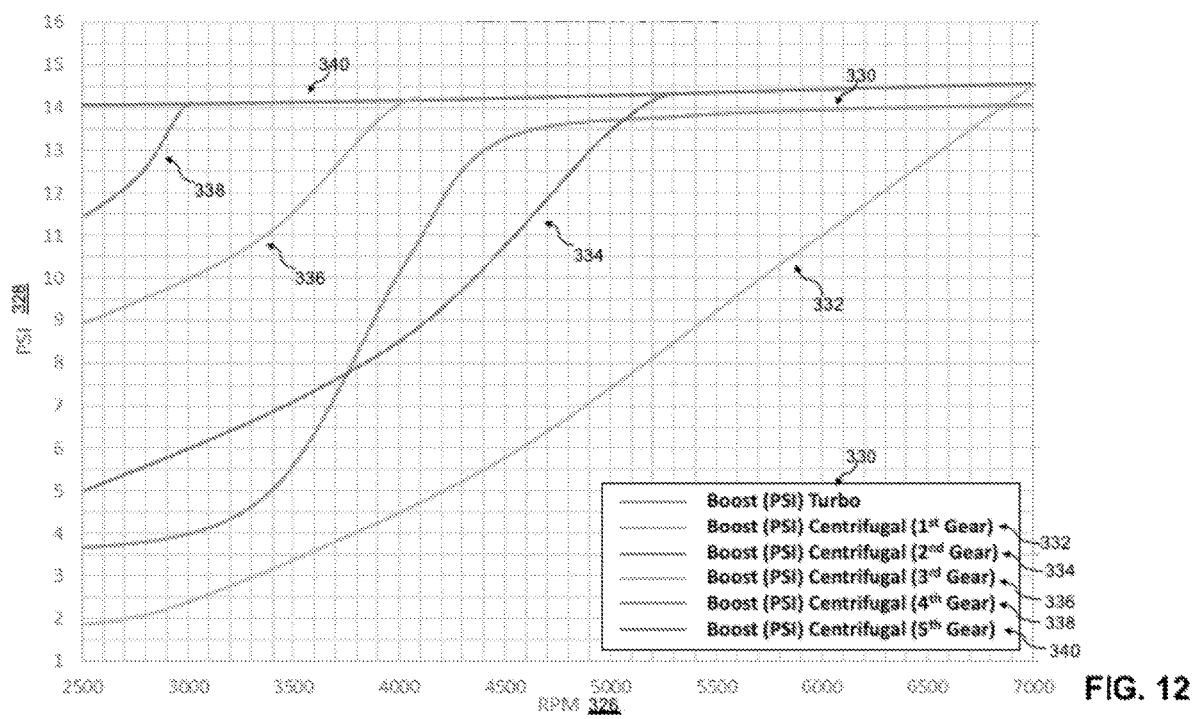
FIG. 12 depicts a graphical representation of curves for turbocharger boost as compared to a centrifugal supercharger boost at different transmission gears and optimized charger's RPM by CVT, according to at least some embodiments disclosed herein.

Specifically, FIG. 12 depicts a graphical representation of curves for turbocharger boost as compared to a centrifugal supercharger boost at different transmission gears and optimized charger's RPM by CVT, according to at least some embodiments disclosed herein. Specifically, FIG. 12 includes an x-axis 326 associated with RPM and a y-axis 328 associated with PSI. Turbocharger boost 330 (in PSI), centrifugal supercharger boost in first gear (in PSI) 332, centrifugal supercharger boost in second gear (in PSI) 334, centrifugal supercharger boost in third gear (in PSI) 336, centrifugal supercharger boost in fourth gear (in PSI) 338, and centrifugal supercharger boost in fifth gear (in PSI) 340 are plotted in FIG. 12.

More specifically, FIG. 12 shows the predicted boost curves for turbochargers as compared to the centrifugal supercharger 202 at different transmission gears and optimized charger's RPM by the CVT 208. As shown in FIG. 12, the first gear that is revered by the CVT 208 acts like a centrifugal supercharger 202 conventionally connected to the engine 204. By the second gear, it would have a matching overall average boost as the turbocharger throughout all RPMs. By the third and fourth gears, the centrifugal supercharger 202 will significantly surpass the turbocharger at low RPM range and reach peak boost significantly shorter than the turbocharger. This results in a much higher overall average boost than the turbocharger which makes the centrifugal supercharger 202 more boost-efficient at higher gears. This will continue to flatten at higher gears (e.g., fifth gear).

Figure 13:
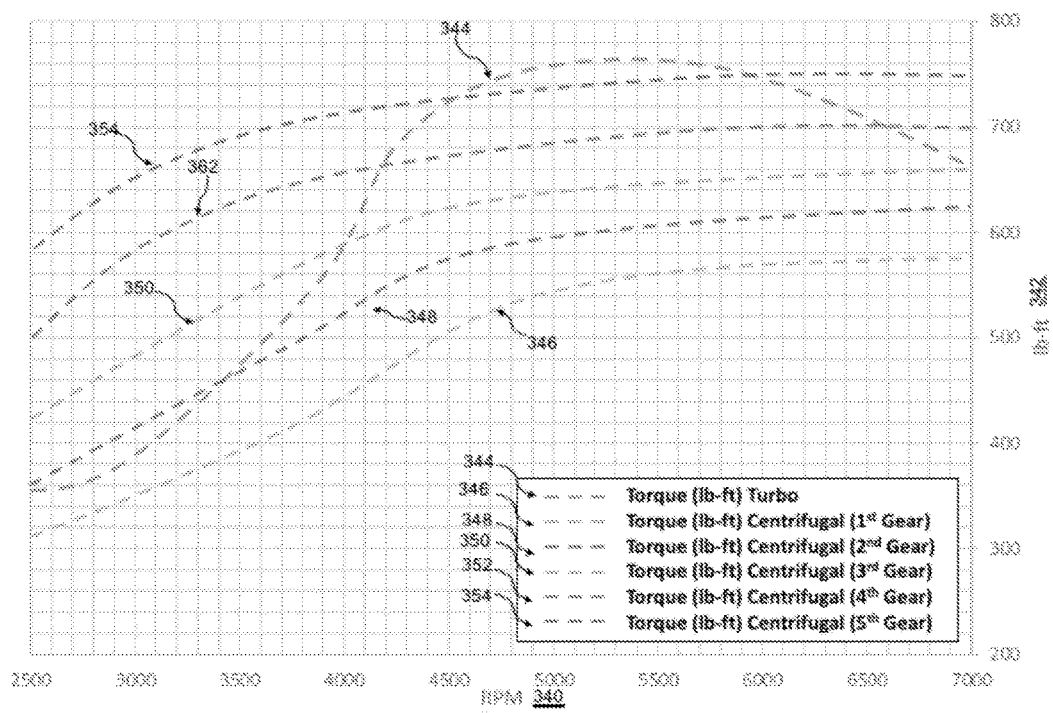
FIG. 13 depicts a graphical representation of turbocharger torque curves as compared to a torque curves for a centrifugal supercharger at different transmission gears and optimized charger's RPM by CVT, according to at least some embodiments disclosed herein.

FIG. 13 depicts a graphical representation of torque curves for turbo as compared to a centrifugal supercharger at different transmission gears and optimized charger's RPM by CVT, according to at least some embodiments disclosed herein. Specifically, FIG. 13 includes an x-axis 340 associated with RPM and a y-axis 342 associated with lb./ft. Turbocharger torque (in lb./ft.) 344, centrifugal supercharger torque in first gear (in lb./ft.) 346, centrifugal supercharger torque in second gear (in lb./ft.) 348, centrifugal supercharger torque in third gear (in lb./ft.) 350, centrifugal supercharger torque in fourth gear (in lb./ft.) 352, and centrifugal supercharger torque in fifth gear (in lb./ft.) 354 are depicted in FIG. 13.

As shown in FIG. 13, higher CVT ratio requires less torque from the transmission output shaft and engine 204. This means, the higher transmission output shaft RPM, the less torque required from the engine 204 to spin and keep the charger at optimum or maximum speed which improves engine torque. As shown, the centrifugal supercharger 202 torque curves converge to turbocharger peak torque at higher gears and maintain it throughout mid-high engine RPMs, which makes the centrifugal supercharger 202 more efficient overall at higher gears. This result is mainly due to less torque (e.g., parasitic load) being withdrawn from the engine 204 to spin the centrifugal supercharger 202 at higher gears.

It should be appreciated that the present invention is intended for both gas and diesel engine vehicles, including sports cars and trucks. Moreover, the present invention provides better, reliable, and more efficient performance than any other forced induction systems known in the art and improves emissions. The higher the gear, the more efficient and the lower the emissions. As shown in FIG. 1, FIG. 12, and FIG. 13, the turbocharger efficiency starts to max out at around 4,500 RPM (e.g., max boost) at every gear. On the other hand, the efficiency of the centrifugal supercharger 202 of this invention is maxed out at around 4,000 RPM on third gear and at around 2,500 RPM on fifth gear with less and less parasitic losses going to higher gears. That efficiency can be maxed out at lower engine RPMs if a lower CVT ratio is used, taking into account the parasitic losses. This is effective especially for diesel engines of trucks that have high torque and can handle high parasitic losses at low gears. Moreover, a vehicle can use its motion momentum to keep the centrifugal supercharger 202 up to speed without hurdles or stresses on the CVT by using the wastegate to divert airflow of the centrifugal supercharger 202 if the engine 204 is disengaged for any reason and re-engaged.

FIG. 14 depicts a tabular representation of system performance during acceleration, according to at least some embodiments disclosed herein. Specifically, FIG. 14 includes numerous columns, such as a first column 238 associated with engine RPM, a second column 364 associated with gear ratio, a third column 366 associated with output shaft RPM, a fourth column 368 associated with CVT ratio, a fifth column 370 associated with CVT output RPM, a sixth column 372 associated with charger pulley ratio, and a seventh column 374 associated with supercharger RPM. FIG. 13 includes data for first gear 376, second gear 378, third gear 380, fourth gear 382, and fifth gear 384.

Figure 15:
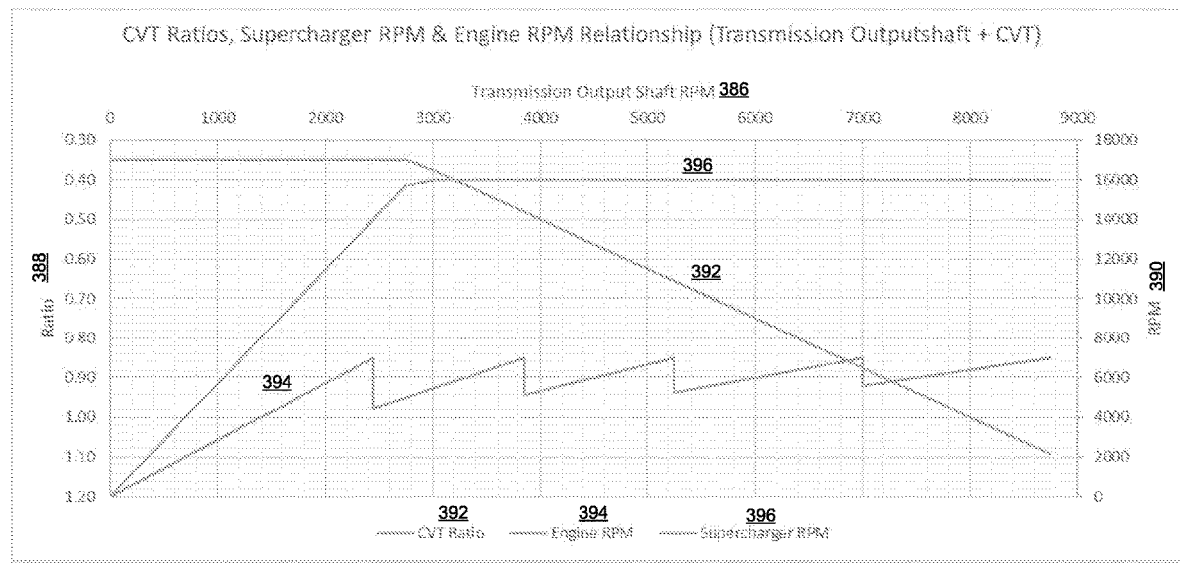
FIG. 15 depicts a graphical representation of the relationship of CVT ratios, supercharger RPM, and engine RPM during acceleration for the present invention, which includes a supercharger driven by a CVT that is driven by a main transmission output, according to at least some embodiments disclosed herein.

FIG. 15 depicts a graphical representation of the relationship of CVT ratios, supercharger RPM and engine RPM during acceleration, according to at least some embodiments disclosed herein. Specifically, FIG. 15 includes an x-axis 386 associated with transmission output shaft RPM and a y-axis 388 associated with the CVT ratio. The CVT ratio 392, the engine RPM 394, and the supercharger RPM 396 are plotted in the graphical representation in FIG. 15.

Moreover, since the centrifugal supercharger 202 depends mainly on the main transmission output to drive the CVT 208, the CVT 208 has to cope with less and easier incremental changes in the output shaft RPM, which extends its lifespan (see, FIG. 14 and FIG. 15). The system described herein can be programmed so that a driver can select the maximum boost desired for the engine 204.

Figure 16:
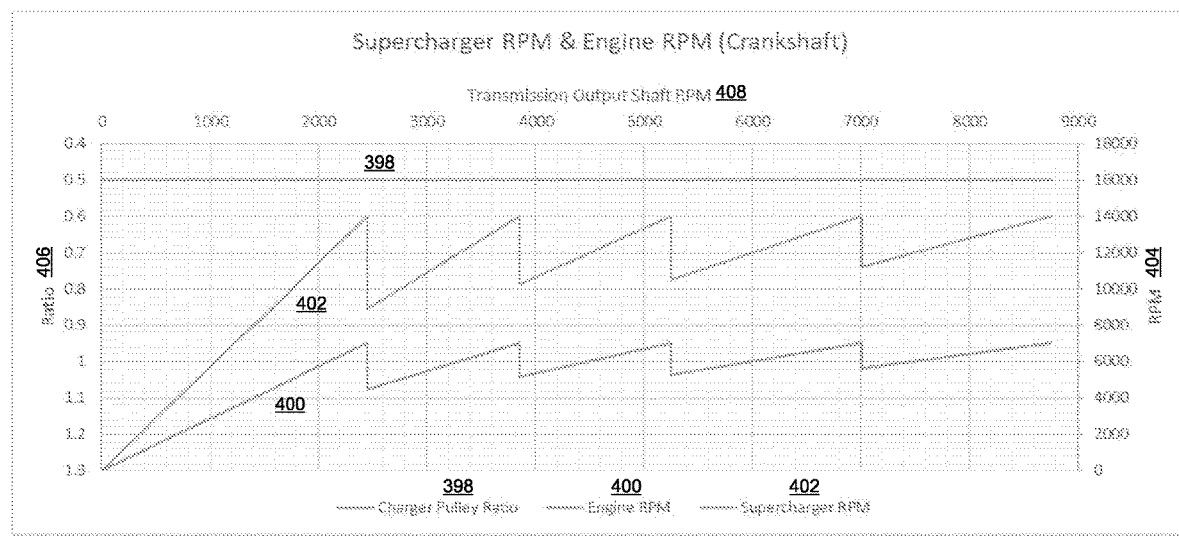
FIG. 16 depicts a graphical representation of supercharger RPM and engine RPM for technology known in the art, which includes a supercharger directly connected to an engine's crankshaft, according to at least some embodiments disclosed herein.

FIG. 16 depicts a graphical representation of supercharger RPM, engine RPM, and the charger pulley ratio, according to at least some embodiments disclosed herein. Specifically, FIG. 16 depicts a left y-axis 406 associated with a ratio, a right y-axis 404 associated with RPM, and an x-axis 408 associated with transmission output shaft RPM. The charger pulley ratio 398, the engine RPM 400, and the RPM 402 of the centrifugal supercharger 202 are plotted in the graphical representation of FIG. 16.

Figure 17:
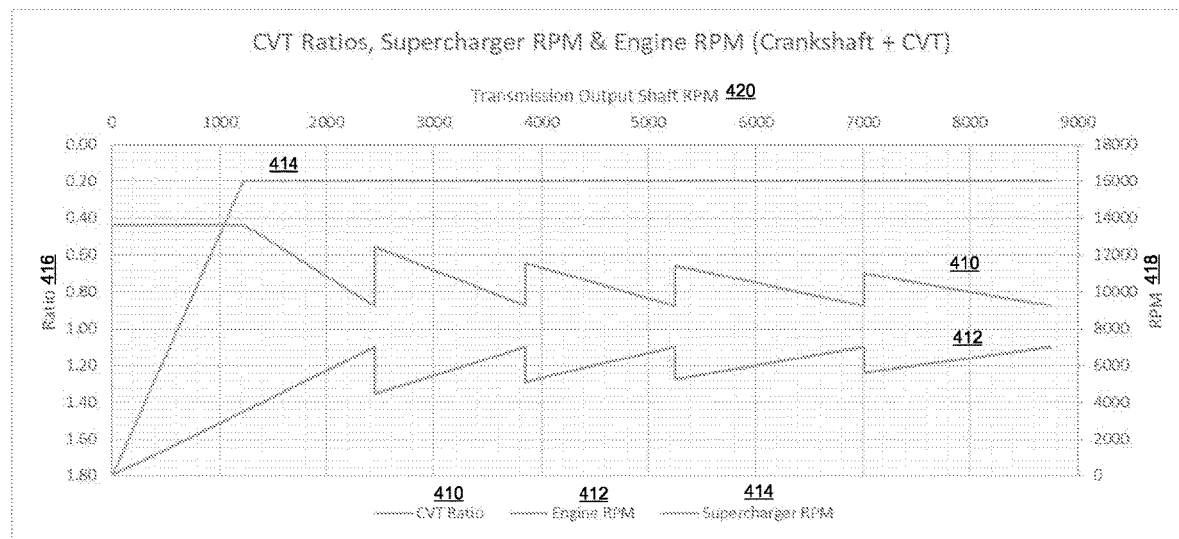
FIG. 17 depicts a graphical representation of CVT ratios, supercharger RPM, and engine RPM for technologies known in the art, which includes a supercharger driven by a CVT that is connected to an engine's crankshaft, according to at least some embodiments disclosed herein.

FIG. 17 depicts a graphical representation of CVT ratios, supercharger RPM, and engine RPM, according to at least some embodiments disclosed herein. Specifically, FIG. 17 depicts a left y-axis 416 associated with a ratio, a right y-axis 418 associated with RPM, and an x-axis 420 associated with transmission output shaft RPM. The CVT ratio 410, the engine RPM 412, and the RPM 414 of the centrifugal supercharger 202 are plotted in the graphical representation of FIG. 17.

The advantages provided by the present invention over the existing technologies may be realized upon viewing FIG. 15 associated with the present invention and FIG. 16 and FIG. 17 associated with existing technologies. Specifically, boost lag created by direct connection to the crankshaft (see, FIG. 16) and frequent and rapid gear ratio change to keep the supercharger at optimal speed at low and mid-range RPMs makes it unreliable and prone to slips and failure (see, FIG. 17). The new invention (of FIG. 15) depicts how a CVT connected to a main transmission output shaft can make the CVT more relaxed with smooth and easy gear ratio change (independent from engine speed) to optimize the speed of the supercharger. This makes it more mechanically efficient than a crankshaft CVT (as depicted in FIG. 17).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system in a vehicle, the system comprising:
   an engine;
   a main transmission;
   a centrifugal supercharger;
   a continuously variable transmission (CVT) connected to an output shaft of the main transmission via one or more gears and connected to the centrifugal supercharger through a CVT output shaft and CVT pulleys, wherein the output shaft of the main transmission is affixed to a drive shaft via at least one joint;
   a first pulley with a clutch affixed to the centrifugal supercharger;
   a second pulley; and
   a belt disposed around the first pulley and the second pulley, wherein the CVT output shaft is affixed to the second pulley.

2. The system of claim 1, wherein the CVT output shaft is rigid.

3. The system of claim 1, wherein the CVT output shaft is flexible.

4. The system of claim 1, wherein the clutch is an electromagnetic clutch.

5. The system of claim 1, wherein the centrifugal supercharger is driven by the CVT, and wherein the CVT is driven by the main transmission through the output shaft.

6. The system of claim 1, wherein the centrifugal supercharger is configured to improve boost of the vehicle at mid and high-end revolutions per minute (RPMs).

7. The system of claim 1, wherein the centrifugal supercharger is configured to reduce boost lag at low-end RPMs with lower power withdrawn from the engine at higher gears.

8. The system of claim 1, wherein, when an output from the main transmission gets faster, lower power is required from the engine to spin the centrifugal supercharger.

9. The system of claim 1, wherein, when an output from the main transmission gets faster, boost is optimized by the CVT.

10. The system of claim 1, wherein the engine comprises a gas engine.

11. The system of claim 1, wherein the engine comprises a diesel engine.

* * * * *